United States Patent
Coudert et al.

(10) Patent No.: US 12,298,419 B2
(45) Date of Patent: May 13, 2025

(54) USER GEOGRAPHIC LOCATION ATTESTATION BY A WIRELESS COMMUNICATION SYSTEM

(71) Applicant: T-MOBILE INNOVATIONS LLC, Overland Park, KS (US)

(72) Inventors: Oliver Coudert, Arlington, VA (US); Lyle Walter Paczkowski, Mission Hills, KS (US); Bharatwajan Raman, Arlington, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 516 days.

(21) Appl. No.: 17/844,384

(22) Filed: Jun. 20, 2022

(65) Prior Publication Data

US 2023/0408629 A1 Dec. 21, 2023

(51) Int. Cl.
*H04W 64/00* (2009.01)
*G01S 5/02* (2010.01)
*H04W 84/04* (2009.01)

(52) U.S. Cl.
CPC .......... *G01S 5/0284* (2013.01); *H04W 64/00* (2013.01); *H04W 84/042* (2013.01)

(58) Field of Classification Search
CPC .... G01S 5/0284; H04W 64/00; H04W 84/042
See application file for complete search history.

(56) References Cited

U.S. PATENT DOCUMENTS

| | | | |
|---|---|---|---|
| 7,595,754 B2 | 9/2009 | Mehta | |
| 7,616,963 B2 | 11/2009 | Kim et al. | |
| 8,296,065 B2 | 10/2012 | Haynie et al. | |
| 8,370,629 B1 | 2/2013 | Ngo et al. | |
| 8,559,975 B2 | 10/2013 | Lin et al. | |
| 8,929,919 B2 | 1/2015 | Burroughs et al. | |
| 9,020,869 B2 | 4/2015 | Sundararajan et al. | |
| 9,247,392 B2 | 1/2016 | Raghupathy et al. | |
| 2020/0210678 A1* | 7/2020 | Yi | H04W 12/71 |

FOREIGN PATENT DOCUMENTS

WO   WO-2009146174 A2 * 12/2009 ............... G01S 5/02

* cited by examiner

*Primary Examiner* — Said M Elnoubi (57) ABSTRACT

A wireless communication network attests to a geographic location of a wireless user device. An access node receives signaling transferred by the wireless user device that indicates the wireless user device, the geographic location, satellite signal characteristics for the geographic location, and terrestrial signal characteristics for the geographic location. The network access node transfers the signaling to a location attestation node. The location attestation node determines known signal characteristics for the geographic location. The location attestation node compares the known signal characteristics to the satellite signal characteristics and the terrestrial signal characteristics. The location attestation node generates a location-attestation score based on the comparison. The location attestation node transfers information that indicates the wireless user device, the geographic location, and the location-attestation score. The location attestation node may comprise a distributed ledge node.

20 Claims, 10 Drawing Sheets

USER GEOGRAPHIC LOCATION ATTESTATION BY A WIRELESS COMMUNICATION SYSTEM

TECHNICAL BACKGROUND

Wireless communication networks provide wireless data services to wireless user devices. Exemplary wireless data services include user data messaging, machine-control, internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network. In another example, an agricultural machine may execute a liquid-dispensing application that characterizes liquid-dispensing operations with live machine-generated data.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), Bluetooth Low Energy (BLE), Low-Power Wide Area Network (LP-WAN), Internet-of-Things (IoT), Near Field Communications (NFC), and the like. The wireless access nodes exchange network signaling and user data with network elements that are often clustered together into wireless network cores. The wireless network elements comprise Access and Mobility Management Functions (AMFs), Session Management Functions (SMFs), User Plane Functions (UPFs), and the like. Many wireless user devices also have access to wireline data networks—perhaps over short-range wireless links. These wireless user devices use the wireline data networks to communicate with the wireless network cores and receive parallel and integrated data communication services over both wireless and wireless systems.

In additional to these terrestrial wireless networks, satellites in earth orbit also exchange wireless satellite signals with some of the wireless user devices. Global Positioning System (GPS) satellites broadcast time-of-day signals with embedded satellite identifiers. The GPS signals are received and processed by the wireless user devices to determine their geographic locations. Communication satellites deliver two-way data communications by relaying user data between the wireless user devices and ground stations. The ground stations are often linked to the wireless network cores to further expand the terrestrial data communication services. Vehicles like aerial drones and autonomous trucks are configured to use parallel and integrated satellite, wireless, and wireline communications.

The geographic locations that are reported by the wireless user devices may be incorrect—whether intentional or not. Some wireless communication networks use sector identifiers or triangulation to confirm the reported geographic locations, but such techniques are not always available. For example, a wireless user device may report its geographic location over public WIFI and internet that are unverifiable and do not perform triangulation. In another example, a wireless user device may report its geographic location over a public satellite network. Unfortunately, the wireless communication networks ineffectively serve user location data due to a lack of transparency, confidence, and availability. Moreover, the wireless communication networks are inhibited from verifying user locations when the wireless user device is reporting over unverifiable public networks.

Technical Overview

A wireless communication network attests to a geographic location of a wireless user device. An access node receives signaling transferred by the wireless user device that indicates the wireless user device, the geographic location, satellite signal characteristics for the geographic location, and terrestrial signal characteristics for the geographic location. The network access node transfers the signaling to a location attestation node. The location attestation node determines known signal characteristics for the geographic location. The location attestation node compares the known signal characteristics to the satellite signal characteristics and the terrestrial signal characteristics. The location attestation node generates a location-attestation score based on the comparison. The location attestation node transfers information that indicates the wireless user device, the geographic location, and the location-attestation score. The location attestation node may comprise a distributed ledge node.

DETAILED DESCRIPTION

Figure 1:
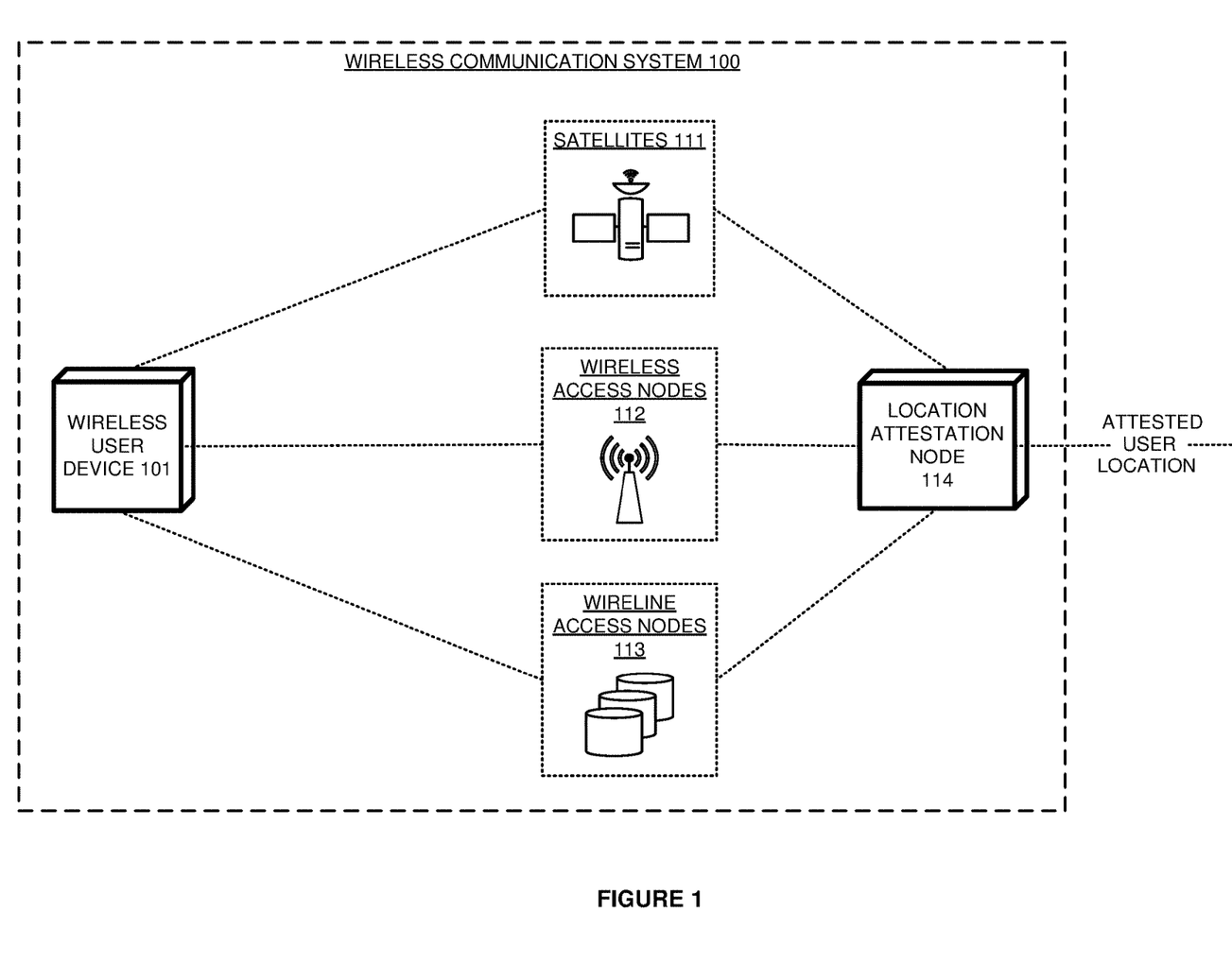
FIG. 1 illustrates an exemplary wireless communication system to attest to geographic locations received from a wireless user device.

FIG. 1 illustrates exemplary wireless communication system 100 to attest to geographic locations received from wireless user device 101. Wireless communication system 100 comprises wireless user device 101, satellites 111, wireless access nodes 112, wireline access nodes 113, and location attestation node 114. Wireless communication system 100 delivers wireless data services to wireless user device 101 like location attestation and exposure, internet-access, and/or some other wireless data products. Wireless user device 101 comprises a computer, phone, sensor, vehicle, robot, or some other data appliance.

Various examples of network operation and configuration are described herein. In some examples, wireless user device 101 receives satellite signals from satellites 111 and receives terrestrial wireless signals from wireless access nodes 112. Wireless user device 101 processes the received signals to generate signal characteristics and its current geographic location. The signal characteristics for satellites 111 comprise satellite identifiers, satellite locations, receive powers, carrier-to-noise density ratios, and/or some other satellite metrics. The signal characteristics for wireless access nodes 112 comprise access node identifiers, network identifiers, Radio Frequency Channel (RF CH) identifiers, RF CH sizes, RF CH Signal to Noise Interference Ratio (SINRs), RF CH Reference Signal Received Powers (RSRPs), RF CH Reference Signal Receive Qualities (RSRQs), RF CH Multiple Input Multiple Output (MIMO) parameters, RF CH Carrier Aggregation (CA) parameters, Public Land Mobile Network Identifiers (PLMN IDs), wireless access node identifiers, and/or some other terrestrial metrics.

Wireless user device 101 transfers its identity, the signal characteristics, and the geographic location to location attestation node 114 over satellites 111, wireless access nodes 112, and/or wireline nodes 113. Location attestation node 114 receives the device identity, signal characteristics, and geographic location from wireless user device 101 over satellites 111 and/or nodes 112-113. Location attestation node 114 determines known signal characteristics for the reported geographic location. For example, location attestation node 114 may enter a network-sector database with the reported geographic location and to yield the known signal characteristics in the network sector at that time. Location attestation node 114 compares the known signal characteristics to the satellite and terrestrial signal characteristics. Location attestation node 114 generates a location-attestation score based on the comparison. To determine the location-attestation score, ranges for the known characteristics may be compared to the reported characteristics. The differences in the characteristics could be translated into sub-scores that aggregate to the total score. The location-attestation score is high when the correspondence between the signal characteristics and the known characteristics is high. The attestation score is low when the correspondence between the signal characteristics and the known characteristics is low. The attestation score could be a binary score— attested or unattested. Location attestation node 114 stores the device identity, the geographic location, and the attestation score—perhaps in distributed ledger using a blockchain format. Location attestation node 114 encrypts information that identifies wireless user device 101, its geographic location, and the location-attestation score. Location attestation node 114 transfers the encrypted information for delivery to an information consumer—typically a data subscriber that has a decryption key for the encrypted information.

In some examples, wireless user device 101 also senses atmospheric data at the geographic location. Wireless user device 101 may detect carbon dioxide levels, dew point, or some other atmospheric data. Wireless user device 101 reports the atmospheric data for the geographic location along with the signal characteristics. Location attestation node 114 retrieves known atmospheric information for the reported geographic location and time. Location attestation node 114 compares the known atmospheric information for the geographic location and time to the atmospheric data reported by wireless user device 101 for the geographic location. Location attestation node 114 generates the location-attestation score based on the atmospheric comparison in addition to the signal characteristic comparison.

Location attestation node 114 may comprise a wireless network slice and/or a distributed ledger node for wireless user device 101. The distributed ledger node stores the user device identities, geographic locations, and attestation scores in a blockchain format that comprises a genesis data block, intermediate data blocks, and eventually a terminating data block. After the genesis block, each data block includes a hash of the previous data block. The distributed ledger node may receive a request for the user data from a requesting data system, and in response, the ledger node transfers the current top data block to the requesting data system.

Advantageously, wireless communication system 100 effectively serves location data with transparency, confidence, and availability. Moreover, wireless communication system 100 attests to user locations when wireless user device 101 is reporting over wireline networks 113.

Wireless user device 101, satellites 111, and wireless access nodes 112 comprise radios that wirelessly communicate using wireless protocols like Fifth Generation New Radio (5GNR), Institute of Electrical and Electronic Engineers (IEEE) 802.11 (WIFI), Low-Power Wide Area Network (LP-WAN), Code Division Multiple Access (CDMA), Frequency Division Multiple Access (FDMA), and Time Division Multiple Access (TDMA). Wireless user device 101, satellites 111, access nodes 112-113, and attestation node 114 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, radio applications, and network applications. The microprocessors retrieve the software from the memories and execute the software to drive the operation of wireless communication system 100 as described herein.

Figure 2:
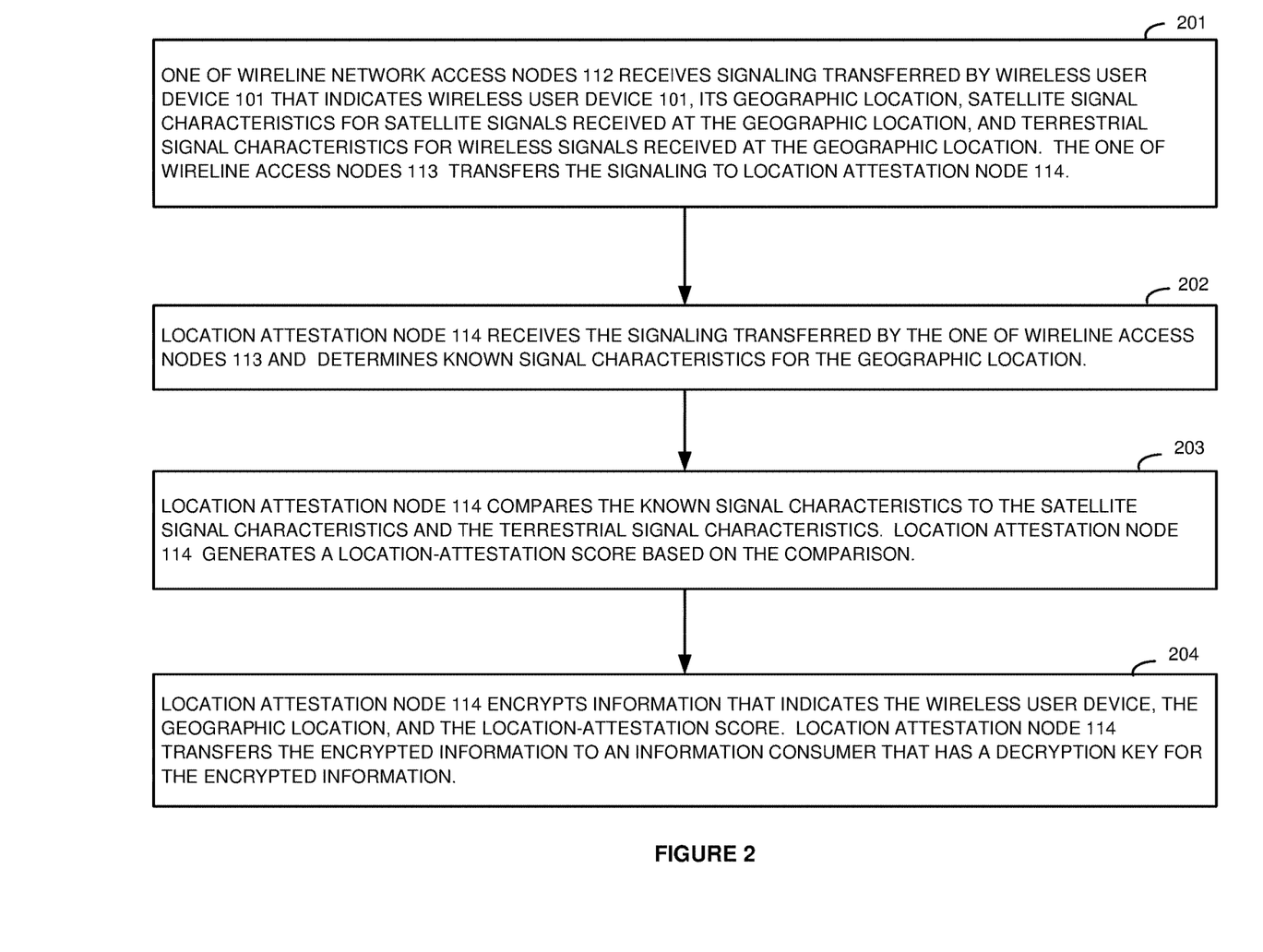
FIG. 2 illustrates an exemplary operation of the wireless communication system to attest to the geographic locations received from the wireless user device.

FIG. 2 illustrates an exemplary operation of wireless communication system 100 to attest to the geographic locations received from wireless user device 101. The operation may vary in other examples. One of wireline access nodes 113 receives signaling transferred by wireless user device 101 that indicates an identity of wireless user device 101, its geographic location, satellite signal characteristics for the geographic location, and terrestrial wireless signal characteristics for the geographic location (201). The one of wireline access nodes 113 receives the signaling transferred by wireless user device 101 and transfers the signaling to location attestation node 114 (201). Location attestation node 114 receives the signaling transferred by wireless user device 101 over the one of wireline access nodes 113 (202). Location attestation node 114 determines known signal characteristics for the reported geographic location (202). Location attestation node 114 compares the known signal characteristics to the satellite and terrestrial signal characteristics (203). Location attestation node 114 generates a location-attestation score based on the comparison (203). Location attestation node 114 encrypts information that identifies wireless user device 101, its geographic location, and the location-attestation score (204). Location attestation node 114 transfers the encrypted information for delivery to an information consumer that has a decryption key for the encrypted information (204).

Figure 3:
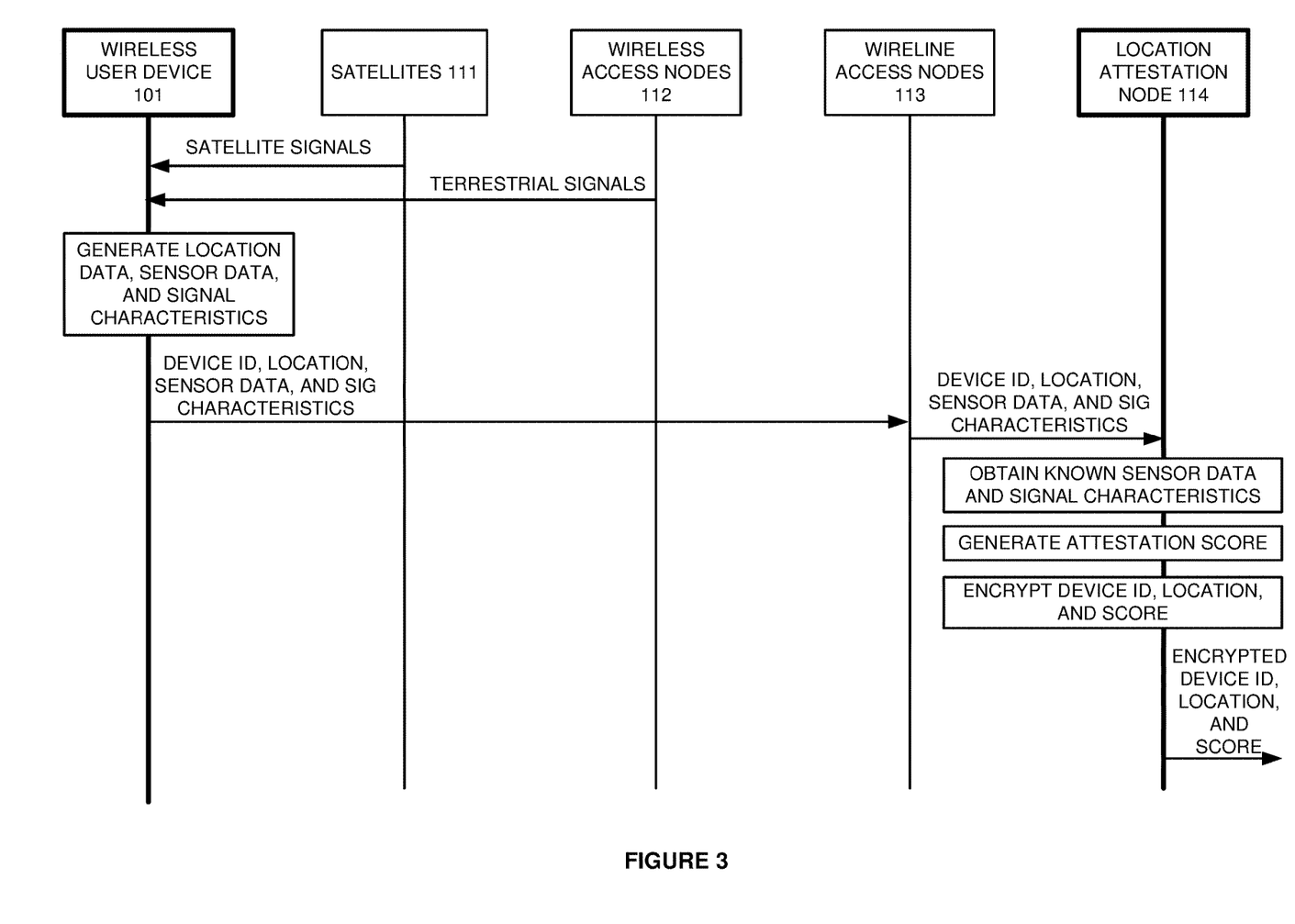
FIG. 3 illustrates an exemplary operation of the wireless communication system to attest to the geographic locations received from the wireless user device.

FIG. 3 illustrates an exemplary operation of wireless communication system 100 to attest to the geographic locations received from wireless user device 101. The operation may vary in other examples. Wireless user device 101 receives satellite signals from satellites 111 and receives terrestrial wireless signals from wireless access nodes 112. Wireless user device 101 processes the received signals to generate signal characteristics and its current geographic location. A sensor in wireless user device detects local phenomena and generates corresponding data like atmospheric parameters, video/audio, or the like. Wireless user device 101 transfers its identity, location data, sensor data, and signal characteristics to location attestation node 114 over one of wireline nodes 113. Location attestation node 114 receives the device identity, location data, sensor data, and signal characteristics from wireless user device 101 over the one of wireline access nodes 113. Location attestation node 114 determines known sensor data and signal characteristics for the reported geographic location. Location attestation node 114 compares the known signal characteristics to the reported signal characteristics to generate a location-attestation score. Location attestation node 114 stores the device identity, the geographic location, and the attestation score—perhaps in distributed ledger using a blockchain format. Location attestation node 114 encrypts information that identifies wireless user device 101, its geographic location, and the location-attestation score. Location attestation node 114 transfers the encrypted information for delivery to an information consumer.

Figure 4:
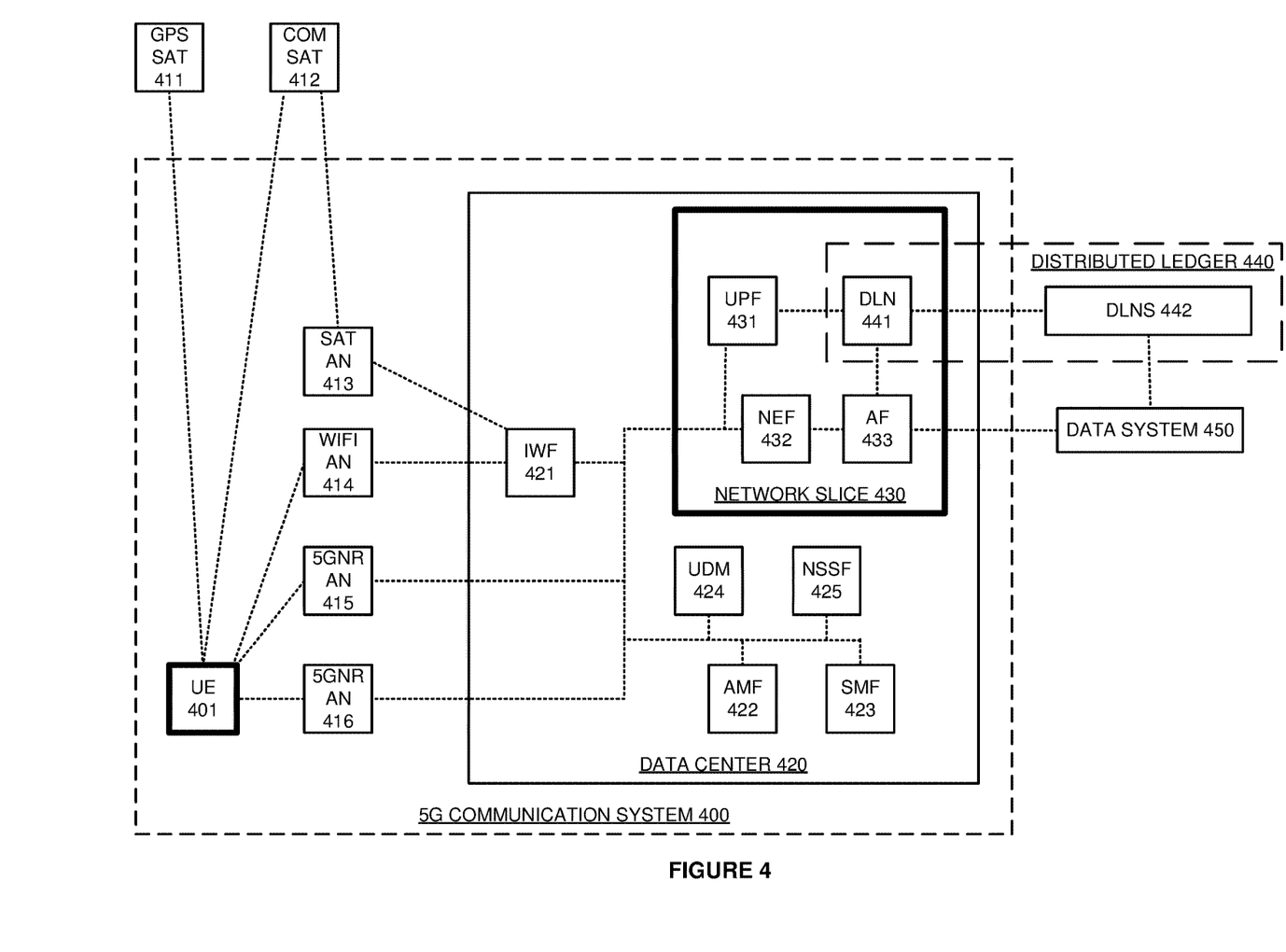
FIG. 4 illustrates an exemplary Fifth Generation (5G) communication system to attest to geographic locations received from a wireless User Equipment (UE).

FIG. 4 illustrates exemplary Fifth Generation (5G) communication system 400 to attest to geographic locations received from wireless User Equipment (UE) 401. 5G communication system 400 comprises an example of wireless communication system 100, although system 100 may differ. 5G communication system 400 comprises: UE 401, Access Nodes (ANs) 413-416, and network data center 420. Network data center 420 comprises Interworking Function 421, Access and Mobility Management Function (AMF) 422, Session Management Function (SMF) 423, Unified Data Management (UDM) 424, Network Slice Selection Function (NSSF) 425, and wireless network slice 430. Wireless network slice 430 comprises User Plane Function (UPF) 431, Network Exposure Function (NEF) 432, Application Function (AF) 433, and Distributed Ledger Node (DLN) 441. DLN 441 is part of distributed ledger 440 which also comprises distributed ledger nodes 442. Network data center 420 typically includes additional network functions like Network Repository Function (NRF) that are omitted for clarity.

UE 401 registers with AMF 422 over at least one of the following paths: 1) UE 401-communication satellite 412-satellite AN 413-IWF 421-AMF 422, 2) UE 401-WIFI AN 414-IWF 421-AMF 422, 3) UE 401-5GNR AN 415-AMF 422, and 4) UE 401-5GNR AN 416-AMF 422. Wireless network slice 430 delivers a location attestation and exposure service. UE 401 reports a capability for wireless network slice 430 to AMF 422. AMF 422 interacts with UDM 424 and UE 401 to authenticate UE 401 with an exchange of hash results that are based on a shared-secret key—perhaps a Subscriber Identity Module (SIM) code. AMF 422 interacts with UDM 424 to authorize UE 401 for reported wireless network slice 430. AMF 422 interacts with NSSF 425 to select slice identifiers for the authorized wireless network slice 430. AMF 422 implements one or more data connections for wireless network slice 430. The data connections may traverse at least one of the following paths: 1) UE 401-communication satellite 412-satellite AN 413-IWF 421-AMF 422-NEF 432-AF 433-DLN 441, 2) UE 401-WIFI AN 414-IWF 421-AMF 422-NEF 432-AF 433-DLN 441, 3) UE 401-5GNR AN 415-AMF 422-NEF 432-AF 433-DLN 441, 4) UE 401-5GNR AN 416-AMF 422-NEF 432-AF 433-DLN 441, 5) UE 401-communication satellite 412-satellite AN 413-IWF 421-UPF 431-DLN 441, 6) UE 401-WIFI AN 414-IWF 421-UPF 431-DLN 441, 7) UE 401-5GNR AN 415-UPF 431-DLN 441, and 8) UE 401-5GNR AN 416-UPF 431-DLN 441.

UE 401 wirelessly receives satellite communication signals from GPS satellites 411 and communication satellites 412. UE 401 determines its geographic location based on the satellite signals from GPS satellites 411. UE 401 determines signal characteristics for the signals from satellites 411-412 like satellite identifiers, received power levels, carrier-to-noise density ratios, satellite locations, and/or some other satellite signal information. UE 401 wirelessly receives 5GNR communication signals from 5GNR ANs 414-415. UE 401 determines terrestrial wireless signal characteristics for the 5GNR signals like network identifiers, AN identifiers, Radio Frequency Channel (RF CH) identifiers, RF CH Signal to Noise Interference Ratio (SINRs), RF CH Reference Signal Received Powers (RSRPs), RF CH Reference Signal Receive Qualities (RSRQs), RF CH Multiple Input Multiple Output (MIMO) parameters, RF CH Carrier Aggregation (CA) parameters, and/or some other wireless signal characteristics. The signal characteristics from other wireless networks like WWI AN 415, Internet-of-Things, broadcast television, and Citizens Broadband Radio Service (CBRS) could be used for attestation in a comparable manner.

UE 401 detects sensor data like temperature, humidity, video, audio, and the like. For attested location exposure over wireless network slice 430, UE 401 transfers a UE Identifier (UE ID), the sensor data, the signal characteristics, and the geographic location to DLN 441 over one or more of the slice connections described above (#1-8) for wireless network slice 430. DLN 441 receives the UE ID, sensor data, signal characteristics, and geographic location transferred by UE 401. DLN 441 accesses a database of known signal characteristics and sensor data for the geographic location and time. Ranges of corresponding values may be used to determine correspondence for dynamic data like receive power levels and humidity levels. The difference between known and reported characteristics of the same type may be translated through a data structure into a correspondence score for those specific characteristics that are aggregated into a total score. DLN 441 compares the sensor data and signal characteristics from UE 401 to the known sensor data and signal characteristics. DLN 441 generates an attestation score for the user data based on the metric comparison. The attestation score is high when the correspondence between the reported sensor data and signal characteristics and the known sensor data and signal characteristics is high. The attestation score is low when the correspondence between the reported sensor data and signal characteristics and the known sensor data and signal characteristics is low. DLN 441 interacts with DLNs 442 to perform a similar attestation transaction in distributed ledger 440—perhaps using a Minimal Viable Consensus (MVC) technique.

DLNs 441-442 store the UE ID, the geographic location, and the attestation score in a blockchain format that eventually comprises a genesis data block, intermediate data blocks, and a terminating data block. After the genesis block, the data blocks each include a hash of the previous data block. One of DLNs 441-442 receives request for attested user data from data system 450, and in response, transfers their current top data block to data system 450. Data system 450 may read the data for the recent transaction and decode the hash to obtain a transaction history. Various network functions could access DLN 441 through AF 433 like data system 450.

Figure 5:
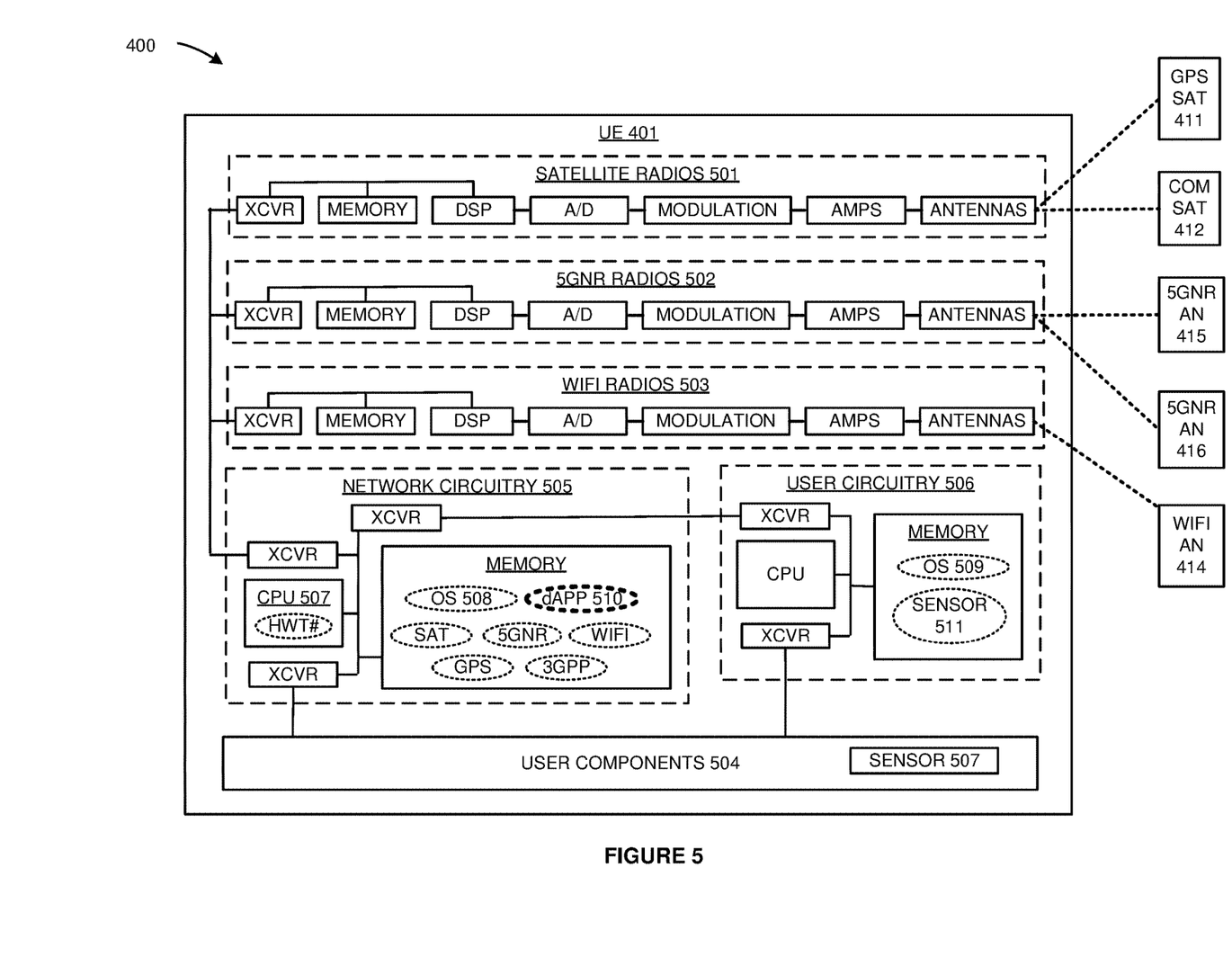
FIG. 5 illustrates an exemplary UE in the 5G communication system.

FIG. 5 illustrates exemplary wireless UE 401 in 5G communication system 400. Wireless UE 401 comprises an example of wireless user device 101, although device 101 may differ. Wireless UE 401 comprises satellite radios 501, 5GNR radios 502, WIFI radios 503, user components 504, network circuitry 505, and user circuitry 506. Radios 501-503 comprise antennas, amplifiers, filters, modulation, analog-to-digital interfaces, DSP, memory, and transceivers that are coupled over bus circuitry. User components 504 comprise sensor 507 that generates sensor data. Network circuitry 505 comprises CPU 507, memory, and transceivers (XCVRs) that are coupled over bus circuitry. CPU 507 is configured with a secret and read-only hardware-trust code (HWT #). The memory in network circuitry 505 stores operating system (OS) 508, distributed Application (dAPP) 510, satellite applications (SAT), 5GNR applications (5GNR), WIFI applications (WIFI), GPS applications (GPS), and Third Generation Partnership Project applications (3GPP). User circuitry 506 comprises CPU, memory, and transceivers that are coupled over bus circuitry. The memory in user circuitry 506 stores operating system (OS) 509 and sensor application (SENSOR) 511.

In network circuitry 505, CPU 507 executes operating system 508 and dAPP 510 and the other network applications. The 3GPP applications register UE 401 with AMF 422 and report a slice 430 capability. The 3GPP applications authenticate UE 401 with AMF 422 through the exchange of hash results that are based on the shared-secret key—which is a SIM code and not the HWT #. The 3GPP applications receive UE context from AMF 422 for the slice connections for wireless network slice 430. For example, UE 401 may be given Internet Protocol (IP) addressing to use over 5GNR AN 416 or IWF 421 to reach wireless network slice 430.

The antennas in satellite radios 501 receive satellite signals from satellites 411-412 and transmit satellite signals to communication satellites 412. The antennas in 5GNR radios 502 exchange terrestrial 5GNR signals with 5GNR ANs 415-416. The antennas in WIFI radios 502 exchange terrestrial WIFI signals with WIFI AN 414. The transceivers in radios 501-503 are coupled to transceivers in network circuitry 505. The transceivers in circuitry 505-506 are coupled to one another and to user components 504. The GPS applications process the received GPS signals to determine geographic location and GPS signal characteristics like received power levels and satellite locations. The satellite applications process the received communication signals to determine additional satellite characteristics like carrier-to-noise density ratios and received power levels. The 5GNR applications process the received 5GNR signals from ANs 415-416 to determine the 5GNR signal characteristics described herein. The WIFI applications may process the received WIFI signals from WIFI AN 414 to determine WIFI signal characteristics like Service Set Identifier (SSID), channel identifier, and received power.

In user circuitry 506, the CPU executes operating system 509 and sensor application 511 to interact with sensor 507 in user components 504 to generate sensor data. For example, sensor 507 may comprise a carbon dioxide detector and sensor application 511 may interact with the carbon dioxide detector to obtain sensor data that indicates live carbon dioxide concentrations. Sensor application 511 transfers the user data to dAPP 510. In network circuitry 505, dAPP 510 receives the user data and the various signal characteristics. dAPP 510 drives CPU 507 to generate Hardware Trust (HWT) data that comprises a random number along with a hash of that random number and the HWT # that is embedded in CPU 507. dAPP 510 compresses and transfers the UE ID, HWT data, sensor data, signal characteristics, and geographic location for delivery to distributed ledger 440 using one of the slice connections for wireless network slice 430.

Figure 6:
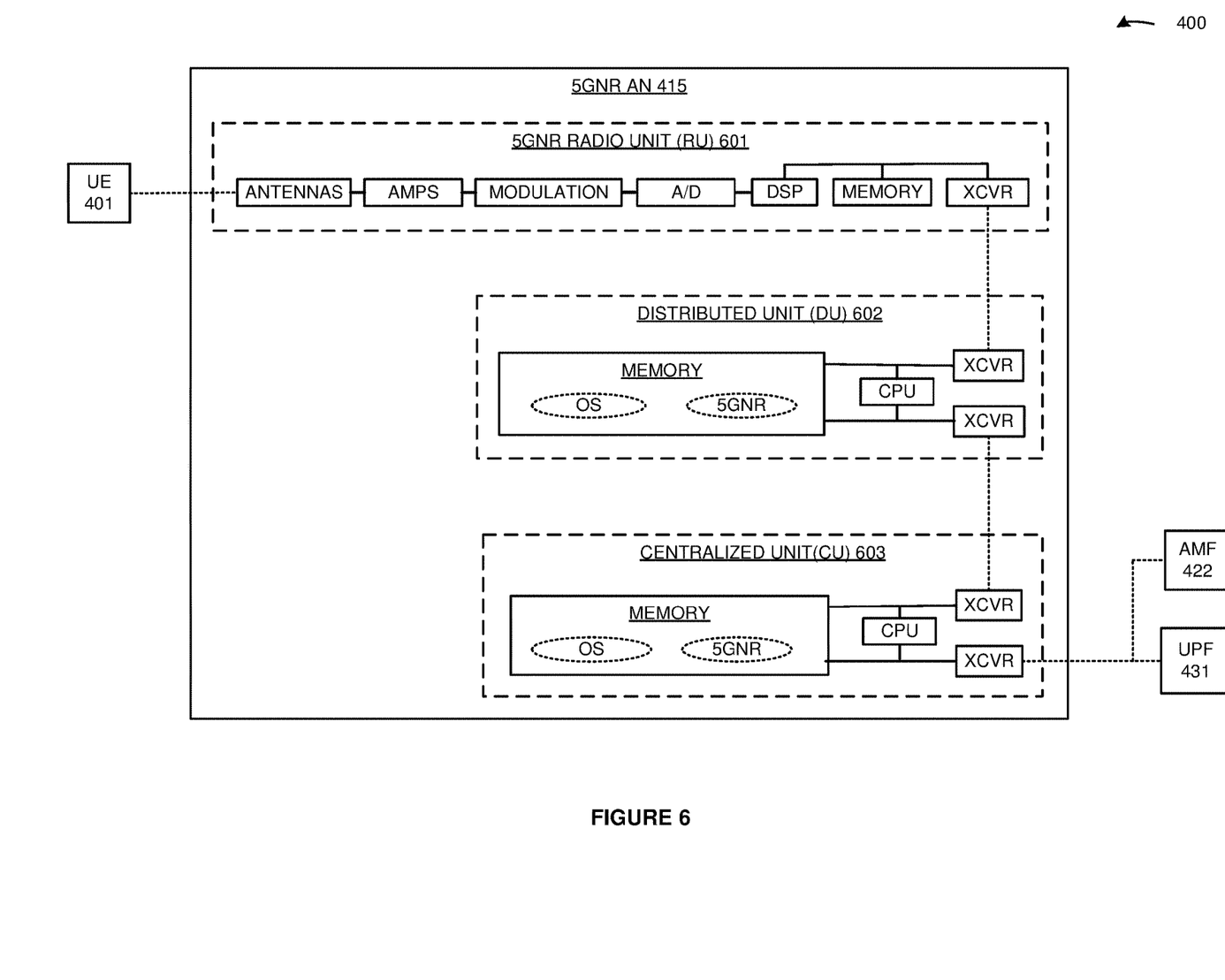
FIG. 6 illustrates an exemplary 5G New Radio Access Node (5GNR AN) in the 5G communication system.

FIG. 6 illustrates exemplary 5G New Radio Access Node (5GNR AN) 415 in 5G communication network 400. 5GNR AN 415 comprises and example of wireless access nodes 112 and 5GNR AN 416, although access nodes 112 and 416 may differ. 5GNR AN 414 comprises 5GNR Radio Unit (RU) 601, Distributed Unit (DU) 602, and Centralized Unit (CU) 603. 5GNR RU 601 comprises antennas, amplifiers, filters, modulation, analog-to-digital interfaces, DSP, memory, radio applications, and transceivers that are coupled over bus circuitry. DU 602 comprises memory, CPU, user interfaces and components, and transceivers that are coupled over bus circuitry. The memory in DU 602 stores operating system and 5GNR network applications for physical layer, media access control, and radio link control. CU 603 comprises memory, CPU, and transceivers that are coupled over bus circuitry. The memory in CU 603 stores an operating system and 5GNR network applications for packet data convergence protocol, service data adaption protocol, and radio resource control. The antennas in 5GNR RU 601 are wirelessly coupled to wireless UE 401 over a 5GNR link. Transceivers in 5GNR RU 601 are coupled to transceivers in DU 602. Transceivers in DU 602 are coupled to transceivers in CU 603. Transceivers in CU 603 are coupled AMF 422 and UPF 426. The DSP and CPU in RU 601, DU 602, and CU 603 execute the radio applications, operating systems, and network applications to exchange data and signaling with UE 401, AMF 422, and UPF 431. In particular, the 5GNR applications broadcast terrestrial wireless signals over RU 601 that are received by UE 401 and used to generate terrestrial wireless signal characteristics.

Figure 7:
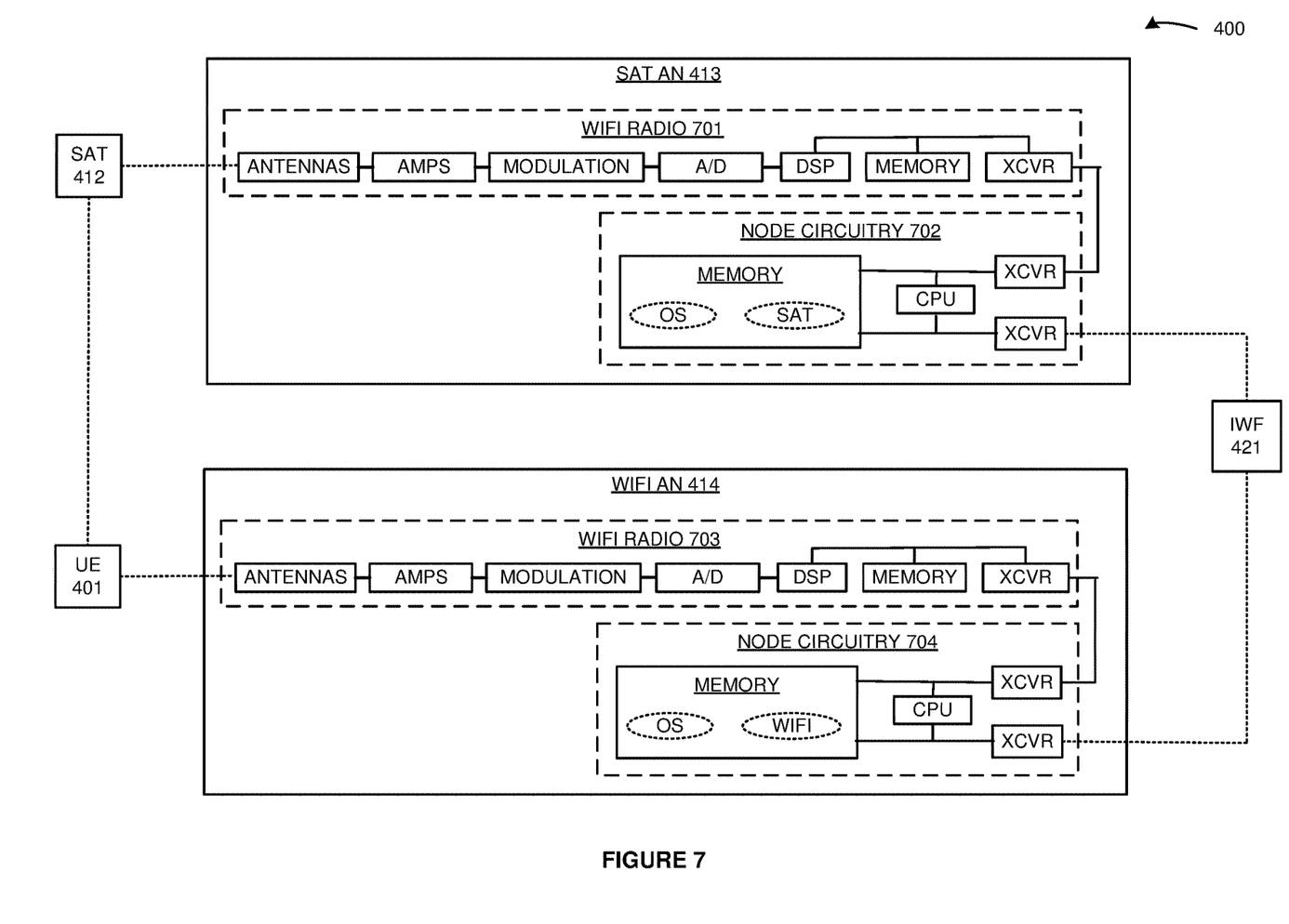
FIG. 7 illustrates an exemplary satellite AN and an exemplary wireless fidelity AN in the 5G communication system.

FIG. 7 illustrates exemplary satellite Access Node 413 and exemplary IEEE 802.11 (WIFI) AN 414 in 5G communication system 400. Satellite AN 413 and WIFI AN 414 comprise examples of wireless access nodes 112, although nodes 112 may differ. Satellite AN 413 comprises satellite radio 701 and node circuitry 702. Satellite radio 701 comprises antennas, amplifiers, filters, modulation, analog-to-digital interfaces, DSP, memory, and transceivers that are coupled over bus circuitry. Node circuitry 702 comprises memory, CPU, user interfaces and components, and transceivers that are coupled over bus circuitry. The memory in node circuitry 702 stores an operating system and network applications for satellite communications. The antennas in satellite radio 701 are wirelessly coupled to satellites 412 over satellite links. Transceivers in satellite radio 701 are coupled to transceivers in node circuitry 702. Transceivers in node circuitry 702 are coupled to transceivers for IWF 421. The CPU in node circuitry 702 executes the operating system and network applications to exchange signaling for wireless UE 401 between satellites 112 and IWF 421. The satellite applications broadcast satellite signals over radio 701 that are received by UE 401 and used by UE 401 to generate the satellite signal characteristics.

WIFI AN 414 comprises WIFI radio 703 and node circuitry 704. WIFI radio 703 comprises antennas, amplifiers, filters, modulation, analog-to-digital interfaces, DSP, memory, and transceivers that are coupled over bus circuitry. Node circuitry 704 comprises memory, CPU, user interfaces and components, and transceivers that are coupled over bus circuitry. The memory in node circuitry 704 stores an operating system and network applications for WIFI. The antennas in WIFI radio 703 are wirelessly coupled to wireless UE 401 over WIFI links. Transceivers in WIFI radio 703 are coupled to transceivers in node circuitry 704. Transceivers in node circuitry 704 are coupled to transceivers for IWF 421. The CPU in node circuitry 704 executes the operating system and network applications to exchange signaling between wireless UE 401 and IWF 421. In some examples, the WIFI applications broadcast terrestrial wireless signals over radio 703 that are received by UE 401 and used by UE 401 to generate the terrestrial wireless signal characteristics.

Figure 8:
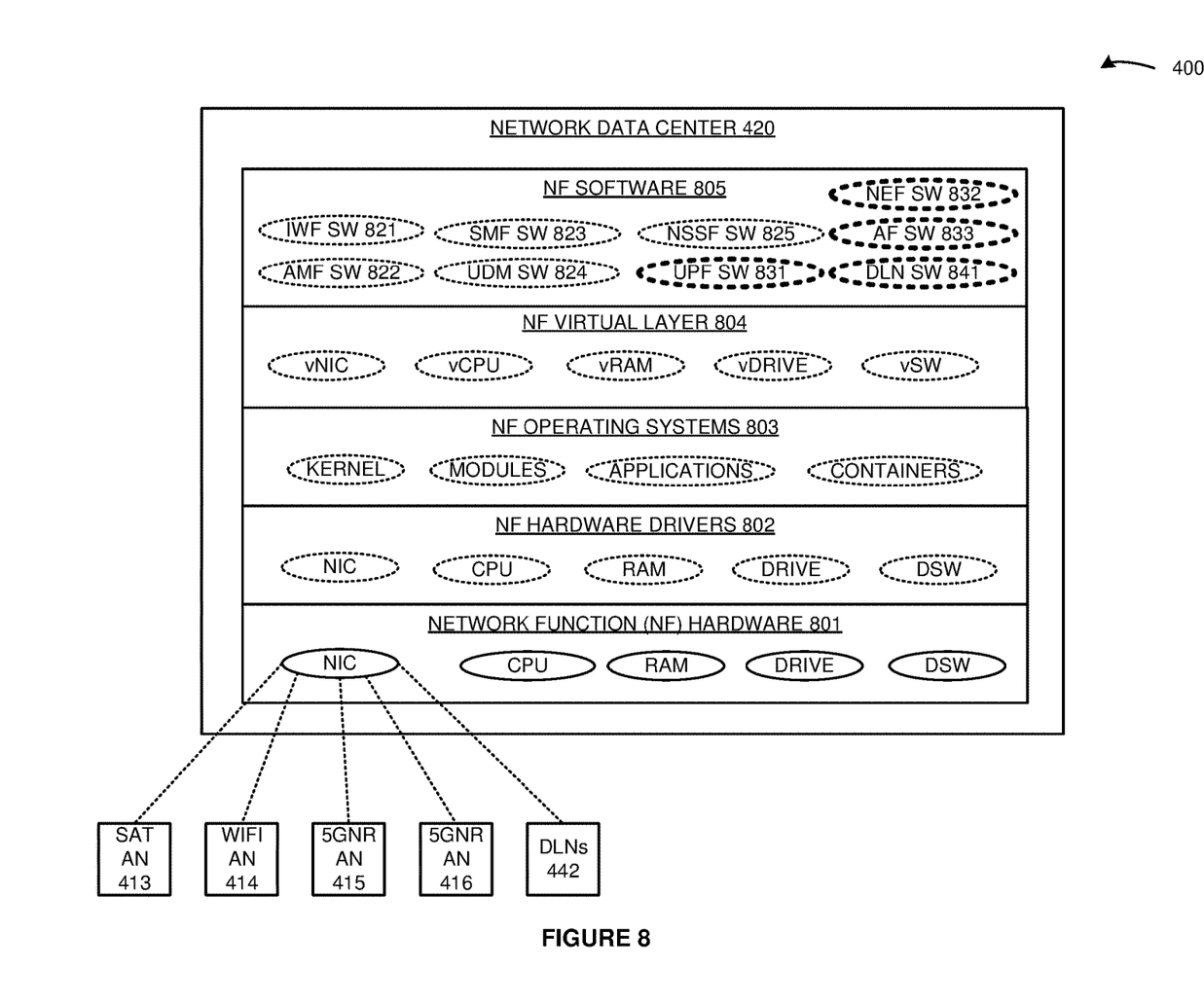
FIG. 8 illustrates an exemplary data center in the 5G communication system.

FIG. 8 illustrates exemplary data center 420 in 5G communication system 400. Network data center 420 comprises an example of location attestation node 114, although location attestation node 114 may differ. Network data center 420 comprises Network Function (NF) hardware 801, NF hardware drivers 802, NF operating systems 803, NF virtual layer 804, and NF Software (SW) 805. NF hardware 801 comprises Network Interface Cards (NICs), CPU, RAM, Flash/Disk Drives (DRIVE), and Data Switches (DSW). NF hardware drivers 802 comprise software that is resident in the NIC, CPU, RAM, DRIVE, and DSW. NF operating systems 803 comprise kernels, modules, and applications that form containers for virtual layer and NF software execution. NF virtual layer 804 comprises vNIC, vCPU, vRAM, vDRIVE, and vSW. NF SW 805 comprises IWF SW 821, AMF SW 822, SMF SW 823, UDM SW 824, NSSF SW 825, UPF SW 831, NEF SW 832, AF SW 833, and DLN SW 841. Other NF SW like Network Repository Function (NRF) SW is typically present but is omitted for clarity. Network data center 420 may be located at a single site or be distributed across multiple geographic locations. The NIC in NF hardware 801 are coupled to satellite AN 413, WIFI AN 414, 5GNR ANs 415-416, and DLNs 442. NF hardware 801 executes NF hardware drivers 802, NF operating systems 803, NF virtual layer 804, and NF SW 805 to form and operate IWF 421, AMF 422, SMF 423, UDM 424, NSSF 425, UPF 431, NEF 432, AF 433, and DLN 441 as described herein.

Figure 9:
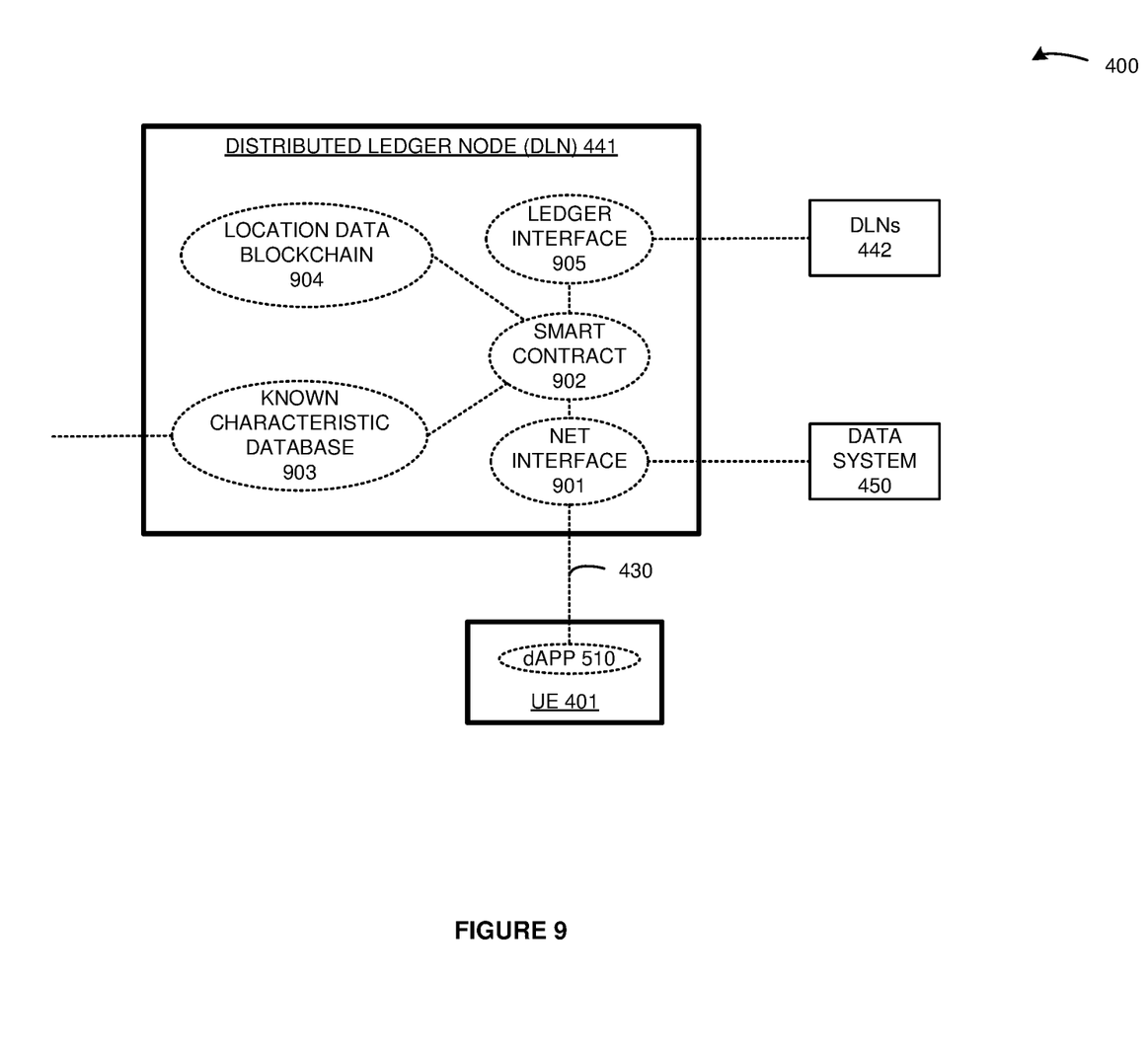
FIG. 9 illustrates an exemplary Distributed Ledger Node (DLN) in the 5G communication system.

FIG. 9 illustrates exemplary Distributed Ledger Node (DLN) 441 in 5G communication system 400. DLN 441 comprises an example of location attestation node 114, although node 114 may differ. For clarity, some components of 5G communication system are omitted from FIG. 9. DLN 441 comprises Network Function (NF) interface 901, smart contract 902, known characteristic database 903, user blockchain database 904, and ledger interface 905. Known characteristic database 903 receives a continuous feed of known network and node IDs, parameter ranges, difference translations, and other information for individual geographic areas like wireless network sectors or some other geographic buckets.

In UE 401, dAPP 510 transfers its UE ID, HWT data, signal characteristics, sensor data, and geographic location to NF interface 901 over wireless network slice 430. NF interface module 901 validates the HWT # based on the random number—possibly by repeating the hash with the random number or by using a certificate authority that has the same HWT # and hash algorithm used by UE 401. Once validated, NF interface module 901 transfers the UE ID, signal characteristics, sensor data, and geographic location to smart contract 902. Smart contract 902 obtains the known characteristics and sensor data for the geographic location from known characteristic database 903 and determines how closely the current signal characteristics and sensor data correspond to the known characteristics. A close correspondence yields a high attestation score and a low correspondence yields a low attestation score. The smart contracts in DLNs 442 replicate the transaction and compare resulting attestation scores to reach a minimal consensus. When the consensus is reached, smart contract 902 stores a new data block in user data blockchain 904 that contains the UE ID, geographic location, attestation score, and hash of the previous data block. Data system 450 and network functions may read the top data block in user data blockchain 904 to obtain the geographic location and attestation score. DLNs 442 may serve access to their own data blocks in a comparable manner.

Figure 10:
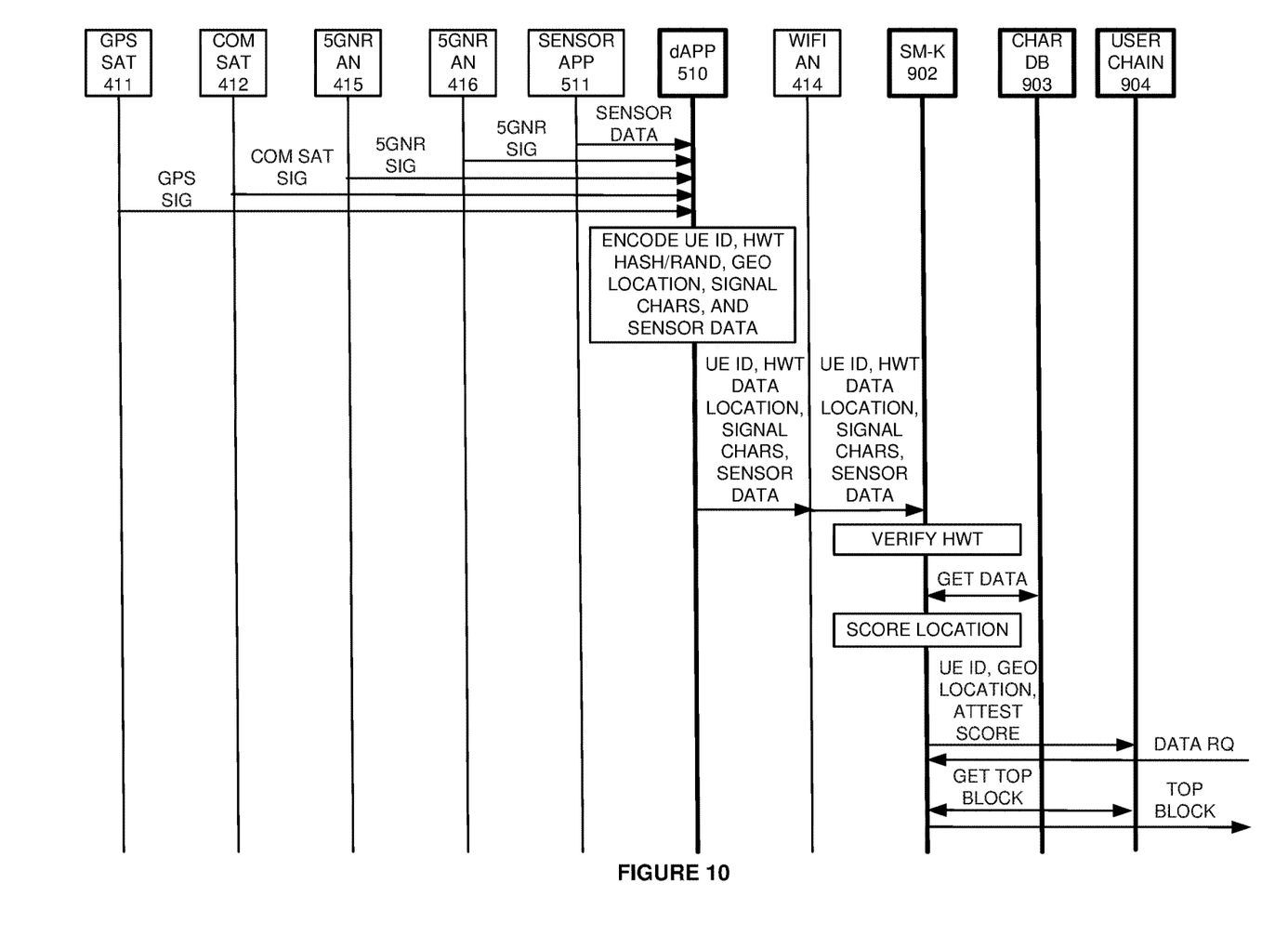
FIG. 10 illustrates an exemplary operation of the 5G communication system to attest to the geographic locations received from the wireless UE.

FIG. 10 illustrates an exemplary operation of 5G communication system 400 to attest to the user data received from wireless UE 401. The operation may differ in other examples. In UE 401, sensor application 511 detects atmospheric conditions like temperature and humidity and transfer corresponding sensor data to dAPP 510. dAPP 510 receives digitized versions of the signals from GPS satellites 411, communication satellites 412, WIFI AN 414, and 5GNR ANs 415-416. dAPP 510 determines its geographic location based on the GPS signals. dAPP 510 determines signal characteristics for the received satellite and 5GNR signals. dAPP 510 obtains HWT data that comprises a HWT hash and a random number that was used to generate the HWT hash with the HWT #. dAPP 510 encodes and transfers the UE ID, HWT data, geographic location, signal characteristics (CHARS), and sensor data to smart contract (SM-K) 902 in DLN 441 over wireless network slice 430. Smart contract 902 retrieves known characteristics and sensor data for the location from known characteristic database (CHAR DB) 903. Smart contract 902 verifies HWT. Smart contract 902 compares the signal characteristics and sensor data from UE 401 to the known signal characteristics and sensor data from known characteristic database 903. Smart contract 902 generates an attestation score for the user data based on the comparison. Smart contract 902 stores the UE ID, geographic location, and attestation score in user blockchain 904.

Smart contract 902 receives a location request for UE 401 transferred by data system 450. Smart contract 902 retrieves the top block from user blockchain 904. Smart contract 902 transfers the top block to the data system 450. Data system 450 uses keys to decode the block and its hash to reveal an attested location history for UE 401.

The wireless data network circuitry described above comprises computer hardware and software that form special-purpose wireless communication circuitry to attest to the geographic locations received from wireless user devices. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless communication circuitry to attest to the geographic locations received from wireless user devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to attest to a geographic location of a wireless user device, the method comprising:
   a network access node receiving signaling transferred by the wireless user device that indicates the wireless user device, the geographic location, satellite signal characteristics for satellite signals received by the wireless user device at the geographic location, and terrestrial signal characteristics for wireless signals received by the wireless user device at the geographic location;
   the network access node transferring the signaling for delivery to a location attestation node;
   the location attestation node receiving the signaling transferred by the network access node, determining known signal characteristics for the geographic location, comparing the known signal characteristics to the satellite signal characteristics and the terrestrial signal characteristics, and generating a location-attestation score based on the comparison;
   the location attestation node encrypting information that indicates the wireless user device, the geographic location, and the location-attestation score; and
   the location attestation node transferring the encrypted information for delivery to an information consumer that has a decryption key for the encrypted information.

2. The method of claim 1 wherein the location attestation node comparing the known signal characteristics to the satellite signal characteristics and generating the location-attestation score based on the comparison comprises comparing satellite identifiers and satellite receive power levels and generating the location-attestation score based on the comparison of the satellite identifiers and the satellite receive power levels.

3. The method of claim 1 wherein the location attestation node comparing the known signal characteristics to the satellite signal characteristics and generating the location-attestation score based on the comparison comprises comparing satellite identifiers and satellite carrier-to-noise density ratios and generating the location-attestation score based on the comparison of the satellite identifiers and the satellite carrier-to-noise density ratios.

4. The method of claim 1 wherein the location attestation node comparing the known signal characteristics to the satellite signal characteristics and generating the location-attestation score based on the comparison comprises comparing satellite identifiers and satellite locations and generating the location-attestation score based on the comparison of the satellite identifiers and the satellite locations.

5. The method of claim 1 wherein the location attestation node comparing the known signal characteristics to the terrestrial signal characteristics and generating the location-attestation score based on the comparison comprises comparing Public Land Mobile Network Identifiers (PLMN IDs) and generating the location-attestation score based on the comparison of the PLMN IDs.

6. The method of claim 1 wherein the location attestation node comparing the known signal characteristics to the terrestrial signal characteristics and generating the location-attestation score based on the comparison comprises comparing wireless access node identifiers and generating the location-attestation score based on the comparison of the wireless access node identifiers.

7. The method of claim 1 wherein the location attestation node comparing the known signal characteristics to the terrestrial signal characteristics and generating the location-attestation score based on the comparison comprises comparing radio frequency channel identifiers and radio frequency channel sizes and generating the location-attestation score based on the comparison of the radio frequency channel identifiers and radio frequency channel sizes.

8. The method of claim 1 wherein the location attestation node comparing the known signal characteristics to the terrestrial signal characteristics and generating the location-attestation score based on the comparison comprises comparing at least one of Signal to Noise Interference Ratio (SINRs), Reference Signal Receive Powers (RSRPs), and Reference Signal Receive Qualities (RSRQs) and generating the location-attestation score based on the comparison of the at least one of the SINRs, the RSRPs, and the RSRQs.

9. The method of claim 1 wherein:
   the network access node receiving and transferring the signaling comprises receiving and transferring the signaling that indicates sensor data sensed by the wireless user device at the geographic location;
   the location attestation node receiving the signaling comprises receiving the signaling that indicates the sensor data sensed by the wireless user device at the geographic location; and further comprising
   the location attestation node comparing known sensor information to the sensor data sensed by the wireless user device at the geographic location; and wherein
   the location attestation node generating the location-attestation score based on the comparison comprises generating the location-attestation score based on the comparison of the known sensor information to the sensor data sensed by the wireless user device at the geographic location.

10. The method of claim 1 wherein:
   the network access node receiving and transferring the signaling comprises receiving and transferring the signaling that indicates atmospheric data detected by the wireless user device at the geographic location;
   the location attestation node receiving the signaling comprises receiving the signaling that indicates the atmospheric data detected by the wireless user device at the geographic location; and further comprising the location attestation node comparing known atmospheric information to the atmospheric data detected by the wireless user device at the geographic location; and wherein the location attestation node generating the location-attestation score based on the comparison comprises generating the location-attestation score based on the comparison of the known atmospheric information to the atmospheric data detected by the wireless user device at the geographic location.

11. A wireless communication network to attest to a geographic location of a wireless user device, the wireless communication network comprising:

a network access node configured to receive signaling transferred by the wireless user device that indicates the wireless user device, the geographic location, satellite signal characteristics for satellite signals received by the wireless user device at the geographic location, and terrestrial signal characteristics for wireless signals received by the wireless user device at the geographic location;

the network access node configured to transfer the signaling for delivery to a location attestation node;

the location attestation node configured to receive the signaling transferred by the network access node, determine known signal characteristics for the geographic location, compare the known signal characteristics to the satellite signal characteristics and the terrestrial signal characteristics, and generate a location-attestation score based on the comparison;

the location attestation node configured to encrypt information that indicates the wireless user device, the geographic location, and the location-attestation score; and the location attestation node configured to transfer the encrypted information for delivery to an information consumer that has a decryption key for the encrypted information.

12. The wireless communication network of claim 11 wherein the location attestation node is configured to compare satellite identifiers and satellite receive power levels and generate the location-attestation score based on the comparison of the satellite identifiers and the satellite receive power levels to compare the known signal characteristics to the satellite signal characteristics and generate the location-attestation score based on the comparison.

13. The wireless communication network of claim 11 wherein the location attestation node is configured to compare satellite identifiers and satellite carrier-to-noise density ratios and generate the location-attestation score based on the comparison of the satellite identifiers and the satellite carrier-to-noise density ratios to compare the known signal characteristics to the satellite signal characteristics and generate the location-attestation score based on the comparison.

14. The wireless communication network of claim 11 wherein the location attestation node is configured to compare satellite identifiers and satellite locations and generate the location-attestation score based on the comparison of the satellite identifiers and the satellite locations to compare the known signal characteristics to the satellite signal characteristics and generate the location-attestation score based on the comparison.

15. The wireless communication network of claim 11 wherein the location attestation node is configured to compare Public Land Mobile Network Identifiers (PLMN IDs) and generate the location-attestation score based on the comparison of the PLMN IDs to compare the known signal characteristics to the terrestrial signal characteristics and generate the location-attestation score based on the comparison.

16. The wireless communication network of claim 11 wherein the location attestation node is configured to compare wireless access node identifiers and generate the location-attestation score based on the comparison of the wireless access node identifiers to compare the known signal characteristics to the terrestrial signal characteristics and generate the location-attestation score based on the comparison.

17. The wireless communication network of claim 11 wherein the location attestation node is configured to compare radio frequency channel identifiers and radio frequency channel sizes and generate the location-attestation score based on the comparison of the radio frequency channel identifiers and radio frequency channel sizes to compare the known signal characteristics to the terrestrial signal characteristics and generate the location-attestation score based on the comparison.

18. The wireless communication network of claim 11 wherein the location attestation node is configured to compare at least one of Signal to Noise Interference Ratio (SINRs), Reference Signal Receive Powers (RSRPs), and Reference Signal Receive Qualities (RSRQs) and generate the location-attestation score based on the comparison of the at least one of the SINRs, the RSRPs, and the RSRQs to compare the known signal characteristics to the terrestrial signal characteristics and generate the location-attestation score based on the comparison.

19. The wireless communication network of claim 11 wherein:

the network access node is configured to receive and transfer the signaling that indicates sensor data sensed by the wireless user device at the geographic location to receive and transfer the signaling;

the location attestation node is configured to receive the signaling that indicates the sensor data sensed by the wireless user device at the geographic location to receive the signaling; and further comprising the location attestation node configured to compare known sensor information to the sensor data sensed by the wireless user device at the geographic location; and wherein the location attestation node is configured to generate the location-attestation score based on the comparison of the known sensor information to the sensor data sensed by the wireless user device at the geographic location to generate the location-attestation score based on the comparison.

20. The wireless communication network of claim 11 wherein:

the network access node is configured to receive and transfer the signaling that indicates atmospheric data detected by the wireless user device at the geographic location to receive and transfer the signaling;

the location attestation node is configured to receive the signaling that indicates the atmospheric data detected by the wireless user device at the geographic location to receive the signaling; and further comprising the location attestation node configured to compare known atmospheric information to the atmospheric data detected by the wireless user device at the geographic location; and wherein the location attestation node is configured to generate the location-attestation score based on the comparison of the known atmospheric information to the atmospheric data detected by the wireless user device at the geographic location to generate the location-attestation score based on the comparison.

* * * * *